US006125517A

United States Patent [19]

Yu

[11] Patent Number: 6,125,517

[45] Date of Patent: Oct. 3, 2000

[54] HAND TOOL FOR LOADING-UNLOADING E-TYPE CLAMPING PIECE

[76] Inventor: Chin-Yung Yu, No. 5, Cheng-Te 3 Lane, Sec. 2, Ta-Ching Street, South Dist., Taichung City, Taiwan

[21] Appl. No.: 09/271,284

[22] Filed: Mar. 17, 1999

[51] Int. Cl.[7] .................................................. B23P 19/04

[52] U.S. Cl. .................................................. 29/229; 29/243.56

[58] Field of Search .................................................. 29/229, 270, 278, 29/243.56

[56] References Cited

U.S. PATENT DOCUMENTS 3,112,560 12/1963 Wagoner .................................. 29/229
3,470,600 10/1969 Hosbach .................................. 29/229
4,475,276 10/1984 Staten .................................. 29/229
4,873,754 10/1989 Gleasman .................................. 29/229
4,942,655 7/1990 Buzzelli .................................. 29/229
5,125,296 6/1992 Nelson et al. .................................. 29/229
5,301,407 4/1994 Koenig .................................. 29/229

*Primary Examiner*—Robert C. Watson
*Attorney, Agent, or Firm*—Bacon & Thomas

[57] ABSTRACT

A pair of pliers for loading-unloading E-type clamping piece mainly comprises a clamping operational strip in shape of a long flat board, wherein a C-opening is formed at one end and a crotched opening at the other; and a handgrip that can be inserted with those two ends of the clamping operational strip alternatively. The handgrip is further provided with a movable pin, which can move up or down, fastening to the clamping operational strip. By virtue of abovesaid construction, the clamping operational strip can hold an E-type clamping piece to clamp at a circular groove on a target article, or vice versa. The C-opening can be used by the way to select a required E-type clamping piece by comparing its opening width with outer diameter of the circular groove on a target article.

3 Claims, 5 Drawing Sheets

HAND TOOL FOR LOADING-UNLOADING E-TYPE CLAMPING PIECE

BACKGROUND OF THE INVENTION

This invention relates to a hand tool, particularly to a pair of pliers that can be used to load or unload an E-type clamping piece.

In assembling machine parts, an E-type or C-type clamping piece is employed very often to limit activities of some parts. The ring shaped E-type clamping piece with an opening contains a pair of smooth and round protruded dots disposed at the opening entrance, standing opposite to each other. The E-type clamping piece is pushed to slide and clamp at a pre-formed circular groove firmly on a target article, where a specific tool must be applied, otherwise, it can hardly be done smoothly. Besides, a wrong E or C-type clamping piece may be selected by eye-measuring occasionally, the in-position clamped E or C-type clamping piece has to be unloaded and the same loading process will be repeated again. Therefore, a designated tool would be required for loading the E or C-type clamping piece that can be gauged with the same before hand for an easier and correct loading operation of the clamping piece.

SUMMARY OF THE INVENTION

This invention is proposed to provide a pair of pliers for loading-unloading a clamping piece with merits of simplified construction, least space occupation, good portability, and easy operation for loading-unloading an E-type clamping piece to or from a target article.

Another object of this invention is to provide a pair of pliers composed of a C-opening that serves as a rough gauge for selecting a required clamping piece in order to waive possible mistakes by eye-measuring.

For achieving abovesaid goals, this invention is embodied with a clamping operational strip, wherein a C-opening is disposed at one end and a crotched opening at the other; an edge in one face of the C-opening is cut to form a dented shallow step in shape of "∠"; and the C-opening communicates inwards with a penetration hole en route and a through hole by end of a long channel.

The crotched opening at the other end communicates inwards with a penetration hole via a long channel, and at both sides of the channel mouth, a concave bearing face with two lateral regulating juts are formed respectively.

A handgrip with a flat insertion slot at one end is provided to accommodate the clamping operational strip, wherein a pair of through holes at a position corresponding to the penetration hole in the clamping operational strip is formed in both faces of the handgrip body for a movable pin to penetrate. A 1st circular groove is formed on surface of the movable pin near its central portion, wherein the movable pin is clad with an umbrella-shaped spring and pushed to penetrate the pair of through holes, and its tail end is bound in order not to escape.

BRIEF DESCRIPTION OF THE DRAWINGS

For a better understanding to the present invention, together with further advantages or features thereof, at least one preferred embodiment will be elucidated below with reference to the annexed drawings in which.

DETAILED DESCRIPTION OF THE PREFERRED EMBODIMENT

Figure 1:
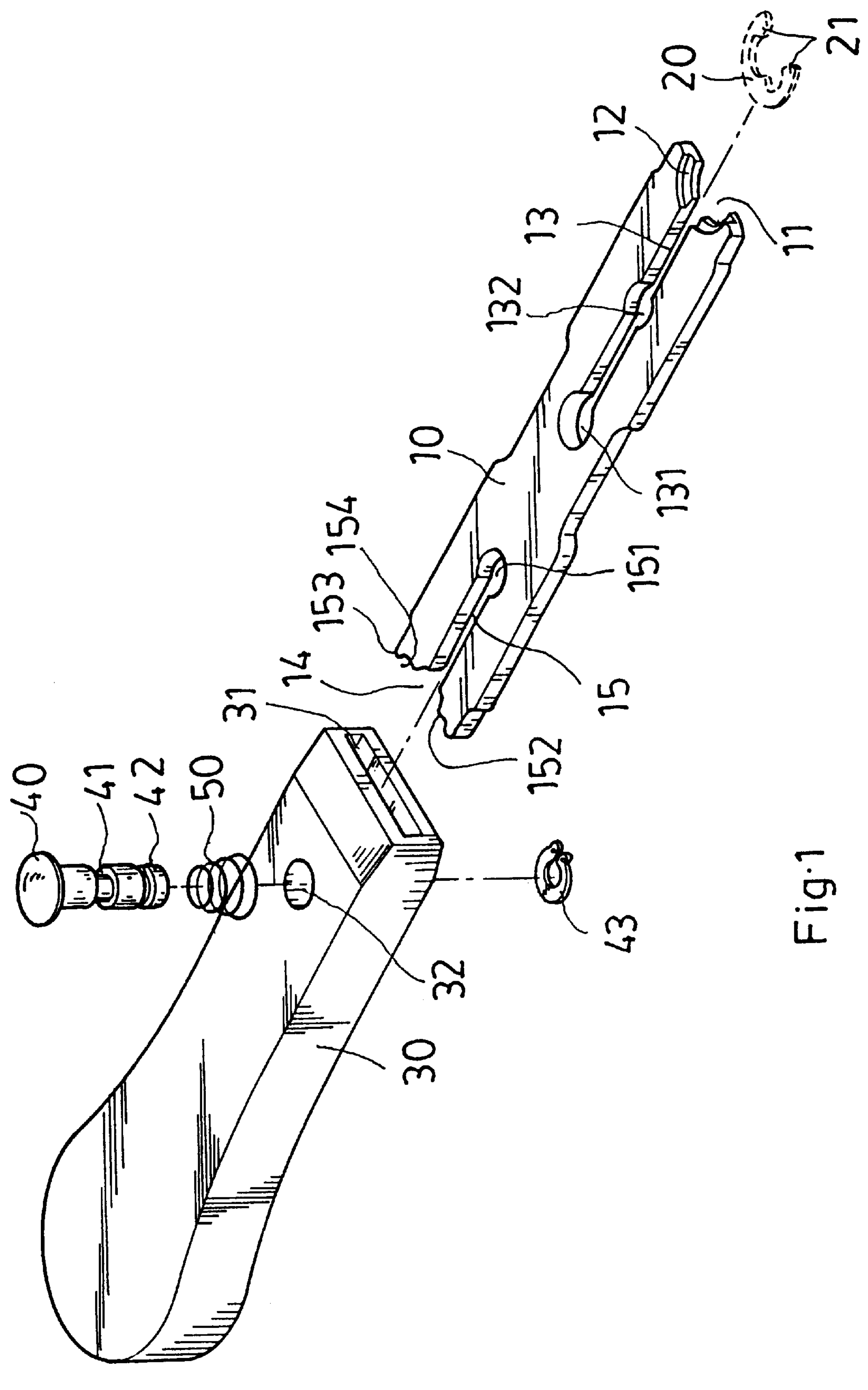
FIG. 1 is a three-dimension exploded view of this invention.
Figure 2:
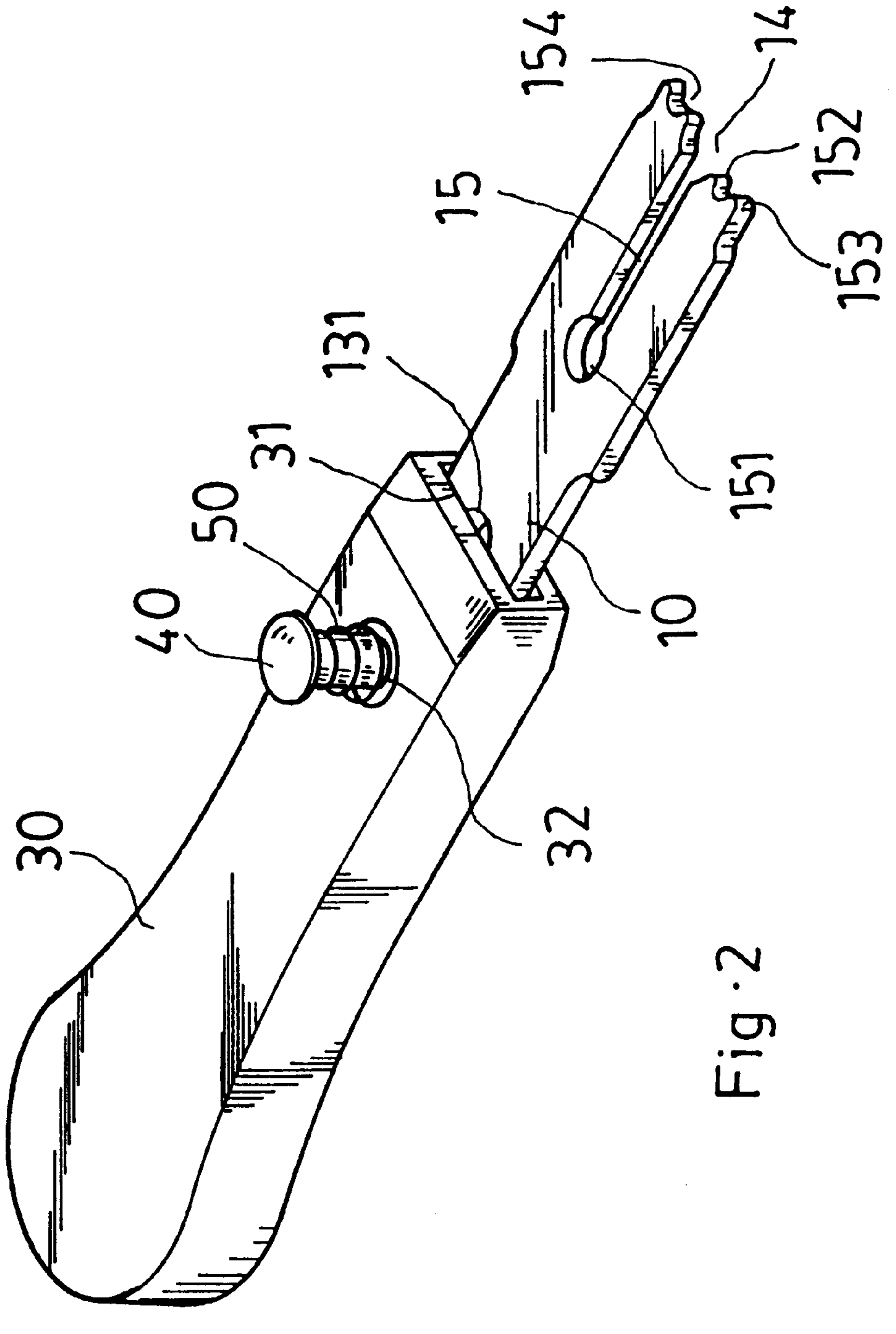
FIG. 2 is an assembled elevational view of this invention.
Figure 3:
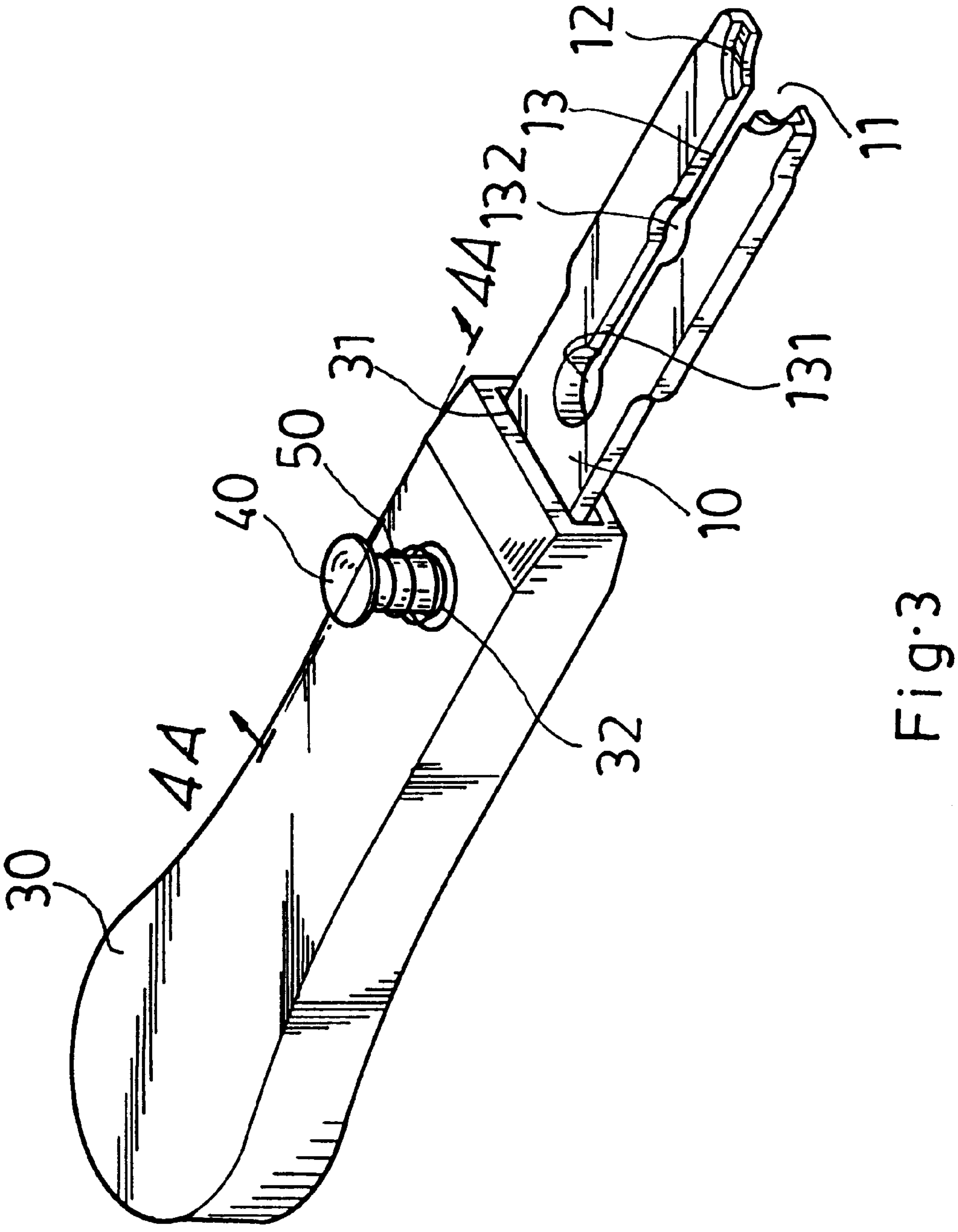
FIG. 3 is another assembled elevational view of this invention.

As shown in FIG. 1 through FIG. 5, the structure of a pair of pliers for loading-unloading an E-type clamping piece of this invention mainly comprises a clamping operational strip 10 and a handgrip 30. A C-opening 11 is disposed at one end of the clamping operational strip 10, wherein a side edge of the C-opening 11 is cut to form a dented shallow step 12 in shape of oblique "∠"; the C-opening 11 communicates inwards with a through hole 132 en route and another 131 at end of a long channel 13 that offers the opening 11 with stretchy capability.

The C-opening 11 is used to accommodate a well-known E-type clamping piece 20, which is to be placed on the shallow step 12 in a direction coincidental with that of the C-opening 11, and the E-type clamping piece can be held stably owing to the oblique design in "∠" shape of the shallow step 12.

A crotched opening 14 is formed at the other end of the clamping operational strip 10, wherein the crotched opening communicates inwards with a through hole 151 via a long channel 15 to offer the crotched opening 14 with stretchablility; and at both sides of the channel mouth, a concave bearing face. 154 with a 1st and a 2nd lateral regulating juts 152, 153 are formed.

The handgrip 30 containing a flat insertion slot 31 at one end is perforated to form a pair of through holes 32, 32' in both faces at a position corresponding to the penetration holes 132, 151 in the clamping operational strip 10 for a movable pin 40 to penetrate.

The movable pin 40 is provided with a 1st circular groove 41 at central portion and a 2nd circular groove 42 at tail end, and the span between those two grooves equals to thickness of the handgrip 30. The movable pin 40 is clad with an umbrella-shaped spring 50 before plugged in the through holes 32, 32' in the handgrip 30, wherein the spring 50 is compressed by the pin head of the movable pin 40 and the upper face of the handgrip 30. The tail end of the movable pin 40 out of the through hole 32' is clamped with a C-type clamping piece 43 at the 2nd circular groove 42 to forbid escape of the movable pin 40, which can move up or down by releasing or pressing the pin head.

Figure 4A:
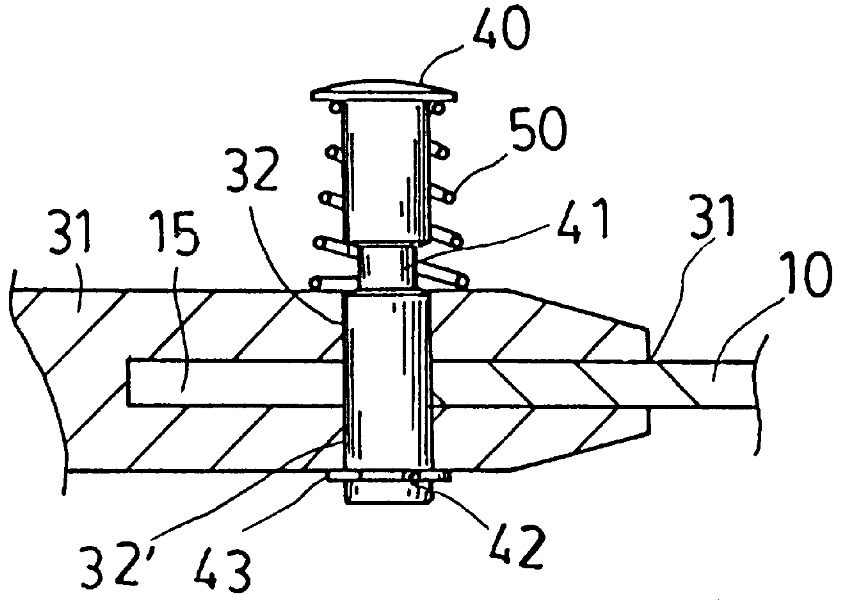
FIG. 4A is a cutaway sectional view along line 4—4 in FIG. 3.

In combining the clamping operational strip 10 to the handgrip 30, the first step is to set and clamp the movable pin 40 in place; then press it down and let the 1st circular groove 41 sink in the insertion slot 31. Plug the crotched opening 14 end into the insertion slot 31 and push the long channel 15 to pass through the 1st circular groove 41 until the penetration hole 151 comes to coincide with the 1st circular groove 41 for the movable pin 40 to penetrate. Release the movable pin 40 to bounce back and let the 1st circular groove 41 locate above the handgrip 30, where the penetration hole 151 permits the pin body between the 1st and the 2nd circular grooves 41, 42 to move up or down. By abovesaid procedure, the clamping operational strip 10 is firmly fixed in the insertion slot 31 without swaying (as shown in FIG. 4A).

Figure 4B:
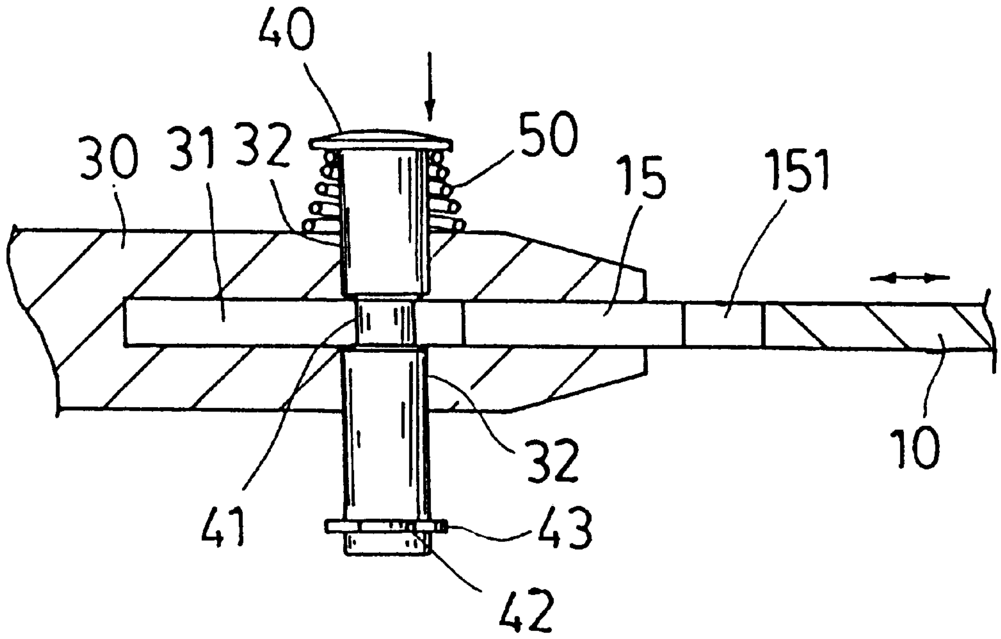
FIG. 4B is a schematic view showing action of FIG. 4A.

When a user is to unload the clamping operational strip 10 from the handgrip 30, the procedure is about the same as above described, namely: pressing down the movable pin 40 to set the penetration hole 151 at a some height level with the 1st circular groove 41, pulling the clamping operational strip 10 outwards to enable the long channel 15 to pass through the 1st circular groove 41 to carry out detachment of the clamping operational strip 10 from the handgrip 30 as shown in FIG. 4B.

By virtue of foregoing construction, combination of the clamping operational strip 10 and the handgrip 30 realizes a hand tool for loading-unloading E-type clamping piece 20. In operation, an E-type clamping piece 20 is fed on the shallow step 12 to coincide with the C-opening 11 of the clamping operational strip 10, which is then moved to let the E-type clamping piece 20 clamp at a pre-formed circular groove on a target article. During clamping process, the mouth of the E-type clamping piece 20 can be elastically widened then restored to swallow the circular groove on the target article and clamp at the same. Meanwhile, the C-opening 11 of the clamping operational strip 10 can also be elastically widened and restored in virtue of the long channel 13. After job has been done, the clamping operational strip 10 is pulled backwards to depart from the E-type clamping piece 20.

Figure 5:
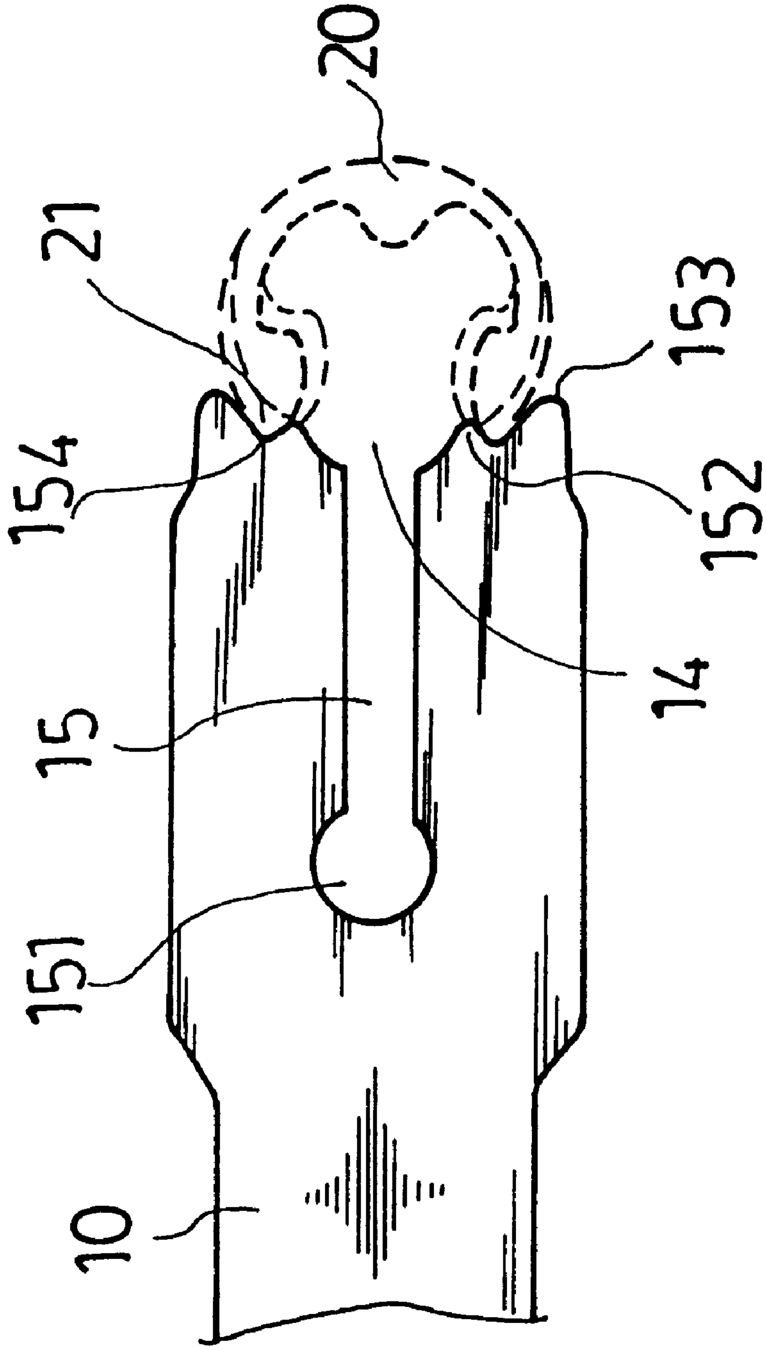
FIG. 5 is an action diagram showing unloading a clamping piece.

When the hand tool of this invention is used to unload the clamped E-type clamping piece 20, a user has to pull the clamping operational strip 10 out from the handgrip 30 at first, then reverse the strip and plug the other end (C-opening) in the insertion slot 31 of the handgrip 30 this time. The cape-like structure at front end of the crotched opening 14 composed of the 1st and the 2nd jut 152, 153 as well as the concave bearing face 154 in-between on respective side is used to regulate and push the protruded dots 21 of the E-type clamping piece 20 to widen them apart, so that the E-type clamping piece 20 is forced to depart from the circular groove as shown in FIG. 5.

The merits of this invention in design and usage may be summarized as:

1. The C-opening 11 of the clamping operational strip 10 of this invention can be made in different scale for different E-type clamping piece 20 to meet various requirements.

2. The C-opening 11 and the shallow step 12 at front end of the clamping operational strip 10 of this invention can hold an E-type clamping piece 20 stably to ensure the latter wiil not be inverted or displaced during pushing against a target article. Besides, mouth of the long channel 13 in the clamping operational strip 10 can be elastically widened just as what the E-type clamping piece 20 has been done in pushing process, so that a smooth clamping of the clamping piece 20 to a target article is made possible.

3. The way to replace operational head of the clamping operational strip 10 of this invention is quite simple. All a user has to do is press down the movable pin 40 with one hand and pull the clamping operational strip 10 outwards with the other. The combination of the clamping operational strip 10 and the handgrip 30 realizes a stable loading-unloading operation for the clamping piece 20.

4. Different C-opening 11 in different scale provides an easy selection of a required clamping piece 20 with better accuracy than eye-measuring by comparing width of the C-opening 11 with outer diameter of a circular groove on a target article.

5. The cape-like structure including the juts 152, 153 with the bearing face 154 in-between is used to regulate and push against the protruded dots 21 of the E-type clamping piece 20 and widen them for detachment.

What is claimed is:

1. A pair of pliers for loading-unloading E-type clamping piece, comprising:

a clamping operational strip in long and flat shape, wherein a C-opening is formed at one end and a crotched opening at the other; the edge of said C-opening in one face of said clamping operational strip is further cut to form a shallow step; said C-opening communicates inwards with a penetration hole en route and a through hole by end of a long channel; said crotched opening communicates inwards with a penetration hole via a long channel; a first and a second jut and a concave bearing face located between said two juts, are disposed at each lateral side near mouth of said long channel respectively;

a handgrip having an inside flat insertion slot at one end, wherein said handgrip is perforated to form a through hole, penetrating said flat insertion slot at a position corresponding to said penetration hole, in the clamping operational strip for a movable pin to go through; a first circular groove is arranged near central portion of said movable pin, which is clad with an umbrella-shaped spring and inserted in said through hole, in said handgrip; said spring is squeezed by pin head of said movable pin and the upper face of said of said handgrip; the tail end of said movable pin penetrating said through hole in the bottom face of said handgrip is activity limited to avoid escaping.

2. The pair of pliers for loading-unloading E-type clamping piece in claim 1, wherein the edge of said shallow step is facing center point of said C-opening and formed in the shape of an acute angle.

3. The pair of pliers for loading-unloading E-type clamping piece in claim 1, wherein a second circular groove is arranged at the tail end of said movable pin, which is activity limited after penetrating said through hole in the bottom face of said handgrip by a C-type clamping piece clamped at said second circular groove.

* * * * *